United States Patent
Tian et al.

(10) Patent No.: US 8,094,433 B2
(45) Date of Patent: Jan. 10, 2012

(54) SUPERCAPACITOR

(75) Inventors: Zhao-Wu Tian, Xiamen (CN);
Quan-Feng Dong, Xiamen (CN);
Ming-Sen Zheng, Xiamen (CN);
Zu-Geng Lin, Xiamen (CN)

(73) Assignee: Xiamen University, Xiamen, Fujian (CN)

( * ) Notice: Subject to any disclaimer, the term of this patent is extended or adjusted under 35 U.S.C. 154(b) by 565 days.

(21) Appl. No.: 12/303,193

(22) PCT Filed: Apr. 10, 2007

(86) PCT No.: PCT/CN2007/001155
§ 371 (c)(1),
(2), (4) Date: Dec. 2, 2008

(87) PCT Pub. No.: WO2007/140688
PCT Pub. Date: Dec. 13, 2007

(65) Prior Publication Data
US 2009/0190286 A1    Jul. 30, 2009

(30) Foreign Application Priority Data
Jun. 5, 2006 (CN) .................. 2006 1 0087625

(51) Int. Cl.
*H01G 9/00* (2006.01)
(52) U.S. Cl. ..................... 361/502; 361/503

(58) Field of Classification Search ........... 361/502, 361/503
See application file for complete search history.

(56) References Cited

U.S. PATENT DOCUMENTS

| 6,356,433 | B1 | 3/2002 | Shi et al. | |
|---|---|---|---|---|
| 6,426,863 | B1 * | 7/2002 | Munshi | 361/503 |
| 6,671,166 | B1 | 12/2003 | Penneau et al. | |
| 6,758,868 | B2 * | 7/2004 | Munshi | 29/25.03 |
| 7,049,233 | B2 | 5/2006 | Kim et al. | |
| 2003/0172509 | A1 | 9/2003 | Maletin et al. | |

FOREIGN PATENT DOCUMENTS

| CN | 1770344 A | | 5/2006 |
|---|---|---|---|
| JP | 06188005 A | * | 7/1994 |
| JP | 2001093560 A | * | 4/2001 |
| JP | 2001102080 A | * | 4/2001 |

OTHER PUBLICATIONS

Wang Xiaofeng et al., "Application of Polyaniline in Hybrid Electrochemical Capacitor" Chinese Journal of Chemical Physics vol. 18, No. 4, Aug. 2005, pp. 635-640 (English language abstract on cover page).

* cited by examiner

*Primary Examiner* — Eric Thomas
(74) *Attorney, Agent, or Firm* — Stradley Ronon Stevens & Young LLP

(57) ABSTRACT

A supercapacitor having a main energy storage form that is based on the electrode reaction of electrochemical active materials in a thin liquid layer near the inner and outer surfaces of porous electrodes.

17 Claims, 2 Drawing Sheets

SUPERCAPACITOR

CROSS-REFERENCE TO RELATED APPLICATIONS

This application is a National Stage entry under 35 U.S.C. §371 of PCT/CN2007/001155 filed on Apr. 10, 2007, which claims priority to Chinese Application No. CN 200610087625.1, filed on Jun. 5, 2006. The entire contents of each of the above-applications are incorporated herein by reference.

BACKGROUND OF THE INVENTION

The present invention relates to a supercapacitor. In particular, it relates to a supercapacitor, the major energy storage method of which is based on the reaction of electrochemical active materials in the thin liquid layer near to the inner and outer surface of the porous electrodes.

As the human society develops it has become more urgent to develop clean, highly efficient ways to utilize energy for the sustainable development of society. Fixed users can easily access the power supply network, whereas mobile users (such as automobiles) have to be dependent on energy storage devices. Such energy storage systems mainly include fossil fuel (for fuel vehicles) or storage battery (for electrically-propelled vehicles) listed below.

Because the caloric value is very high for gasoline, it ranks on top of the list for the highest energy density in term of chemical energy storage. Therefore, the speed and mileage for fossil fuel vehicles are advantageous. The drawbacks of fuel automobile, however, (especially in urban areas) are becoming very serious with the depletion of petroleum resources gasoline and the worsening of the environmental pollution caused by burning fossil fuels. Therefore, the need to develop vehicles with clean and economic energy is also becoming increasingly urgent.

Electrically-propelled automobiles with storage a battery or batteries as energy storage devices do not pollute the environment. However, the storage batteries have the disadvantages of a lower power density, bad cycle life and safety problems, and cannot meet the desired power requirements. In recent years, greater efforts have been made to develop supplementary energy with higher specific power and moderate specific energy as energy storage devices for hybrid electric automobiles, aiming to meet the requirements of high power for electrically-propelled automobiles for accelerating, starting and braking.

Electrically-propelled automobiles may also use supercapacitors as an energy storage device. Because the supercapacitors possess the advantages of (1) rapid charging and discharging, (2) no environmental pollution, (3) a longer cycle life, and (4) the ability to recover the kinetic automobile braking energy, they promise to be the new urban green energy for this century. The capacity of supercapacitors first comes from the capacity of the electric double layer on an electrode/solution interface. By using the high specific surface of carbon material and an aerogel, a bigger capacitor with a capacity of up to 10-100 F/g can be generated, and the charging and discharging speed is typically very fast. But compared with storage batteries, the energy density of the supercapacitor with the electric double layer capacity is low. The second source of supercapacitor capacity comes from the electrochemical process on the material surface, which is also referred to as "pseudo-capacity." The presence of the pseudo-capacity could increase greatly the capacity of supercapacitors. The pseudo-capacitor is also essentially determined by the electrochemical process for energy storage, which is fundamentally the same as the storage battery (such as, for example, a lithium battery) and, therefore, the supercapacitor based on the pseudo-capacity can be regarded as a battery with super high specific powder and long life. Currently, the means for the pseudo-capacity formation include:

(1) Chemical surface absorption and desorption as well as underpotential deposition on the electrode;

(2) Oxidation and reduction reaction of oxides membrane such as $RuO_2$, $IrO_2$ and $Cr_3O_4$ on the electrode surface;

(3) Doping and undoping of the electrically conductive polymer; however, the various pseudo-capacity supercapacitors have drawbacks such as, for example, a poor life cycle, high price, and other issues that prevent them from meeting the requirements of practical use.

There are many patents for supercapacitors. For an example, the recent U.S. Pat. No. 7,049,233 proposes to use porous ruthenium oxide membrane as an electrode. U.S. Pat. No. 6,671,166 discloses an organic supercapacitor made of carbon material with high specific surface. CN1770344 discloses a supercapacitor in which the medal oxide nanotube and porous carbon composite material are used as both cathode and anode. Such supercapacitors, however, all depend on solid surface electric double layer capacity or "pseudo-Faraday" reaction with a solid electrode as the active material. There is a need in the art for an improved supercapacitor.

BRIEF SUMMARY OF THE INVENTION

This need has been satisfied by the present invention. The present invention provides a a positive electrode member comprising a solid material comprising pores and an electrically conductive current collector element wherein the pores comprise a non-flowing liquid comprising a redox agent; a negative electrode member comprising a solid material comprising pores and an electrically conductive current collector element wherein the pores comprise a non-flowing liquid comprising a redox agent; and a separator member disposed between the positive electrode member and the negative electrode member, wherein the separator member is an ion exchange membrane.

DETAILED DESCRIPTION OF THE INVENTION

Figure 1:
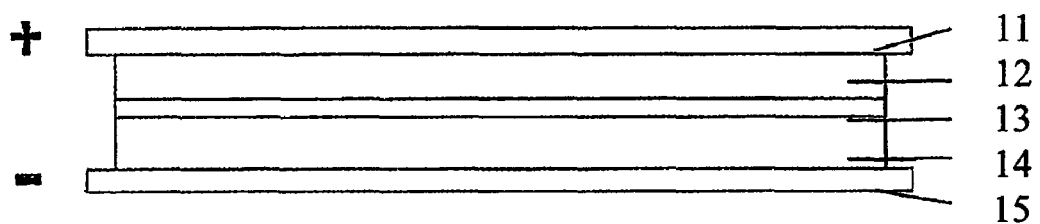
FIG. 1 shows structural representation of Example 1 of the present invention.

The objective of the present invention is to overcome the shortcomings of existing supercapacitors by providing a supercapacitor having a main energy storage form that is based on the electrode reaction of electrochemical active materials in a thin liquid layer near the inner and outer surfaces of porous electrodes.

The present invention provides a supercapacitor comprising: a positive electrode member comprising a solid material comprising pores and an electrically conductive current collector element wherein the pores comprise a non-flowing liquid comprising a redox agent; a negative electrode member comprising a solid material comprising pores and an electrically conductive current collector element wherein the pores comprise a non-flowing liquid comprising a redox agent; and a separator member disposed between the positive electrode member and the negative electrode member, wherein the separator member is an ion exchange membrane. At the positive electrode, an electrochemical oxidation-reduction reaction (referred to herein as a "redox" reaction) is mainly conducted on an inner surface of the positive electrode and, at the negative electrode, an electrochemical redox reaction is mainly conducted on the inner surface of the negative electrode.

The supercapacitor according to the present invention comprises a positive electrode member comprising a solid material comprising pores and an electrically conductive current collector element, wherein the pores comprise a non-flowing liquid comprising a first redox reagent. The supercapacitor according to the present invention also comprises a negative electrode member comprising a solid material comprising pores and an electrically conductive current collector element, wherein the pores comprise a non-flowing liquid comprising a second redox reagent.

The electrode materials used for the positive and negative electrodes are preferably electrochemically inert materials. Such electrochemically inert materials are preferably good electric conductors and are chemically stable to the positive and negative electrode liquids. Examples of such electrochemically inert materials include, for example, carbon materials such as, for example, graphite, carbon black, carbon nanometer tube, activated carbon, and amorphous carbon; inert or passivated metals such as, for example, passivated nickel, and noble metals; alloy materials such as, for example, stainless steel; and electrically-conductive polymer materials such as, for example, polymers derived from aniline, thiophene, pyrrole, and furan. The thickness of the positive and negative electrodes is typically from about 0.001 mm to 5.0 mm.

Preferably, the positive and negative electrodes of the supercapacitor according to the present invention are porous. Porous electrodes can comprise micropores, including the porous electrodes comprising thread-like materials such as, for example, carbon fabric/fibers, and porous electrodes composed of many thin micron or submicron sheet materials.

The spaces between the thin micron or submicron sheet materials are filled with positive or negative electrode liquid. The liquid can not flow inside the space freely, the mass transmission mainly depends on the diffusion and electric migration. The size of space is less than about 100 µm, preferably about 0.1 µm to 100 µm, the voidage is from about 10% to about 99%, the electrochemical active material at any point in the liquid inside the pore is very close to the surface of the current collector. The time typically needed from mass transmission to porous solid electrode surface is very short, and is less than 10 seconds.

The function of the positive and negative electrode collectors is to collect electric current, and the materials used in positive and negative electrode collector are the good electric conductors, which can be selected from metal materials or carbon composite materials.

When employed in series to form at least two supercapacitors, a current collector can function as both a positive and a negative current collector.

The aforementioned positive electrode liquid contains at least one kind of positive electrode electrochemically-active material, and the aforementioned negative electrode liquid contains at least one kind of negative electrode electrochemically-active material such that the electrochemical products (reduced on negative electrode) are oxidized on positive electrode while charging and are converted back to the previous state uncharged while discharging. Accordingly, the active materials according to the present invention that are inter-transformed between an oxidized state and a reduced state by electrochemical reaction are simply called as redox reagents. The redox reagent employed by the positive electrode liquid is referred to herein as a "first redox reagent" and the redox reagent employed in the negative electrode liquid is referred to herein as a "second redox reagent." Each of the first and second redox reagents comprise one or more reagents.

The electrochemical active materials in the positive and negative electrode liquids preferably meet the following requirements. First, they be readily soluble in the liquid and can be prepared into a concentrated solution to obtain higher single charging and discharging energy density for supercapacitor. Second, the speed of the electrochemical oxidation reduction reaction should be fast to obtain higher energy efficiency during charging and discharging cycle course for supercapacitor. Third, the redox potential of the redox reagents should be within (or at least close to) the redox potential window of the solvent to prevent the solvent from being oxidized or reduced and to maximize the voltage (i.e., power) of the capacitor. As used herein, the term "redox potential window" refers to the voltage range allowed by a solvent without electrolysis, if the external voltage is higher than this voltage range, the solvent will electrolyze to decompose.

Preferred first redox reagents are selected from the group consisting of a) $VO^{++}/VO_2^+$, wherein the $VO^{++}$ ions are oxidized to the $VO_2^+$ ion while charging, and the $VO_2^+$ ions are reduced to the $VO^{++}$ ions white discharging; b) $Br^-/Br_2$, wherein $Br^-$ ions are oxidized to the $Br_2$ molecule while charging, and the $Br_2$ molecule is reduced to the $Br^-$ ion while discharging; c) $NbO^{++++}/NbO_2^+$, wherein the $NbO^{++++}$ ions are oxidized to the $NbO_2^+$ ion while charging, and the $NbO_2^+$ ions are reduced to the $NbO^{++++}$ ions while discharging; d) $Fe^{++}/Fe^{+++}$, wherein the $Fe^{++}$ ions are oxidized to the $Fe^{+++}$ ions while charging, and the $Fe^{+++}$ ions are reduced to the $Fe^{++}$ ions while discharging; and e) $Ce^{+3}/Ce^{+4}$, wherein the $Ce^{+3}$ ions are oxidized to the $Ce^{+4}$ ions while charging, and the $Ce^{+4}$ ions are reduced to the $Ce^{+3}$ ions white discharging.

Preferred second redox reagents are selected from the group consisting of a) $V^{+++}/V^{++}$, wherein the $V^{+++}$ ions are reduced to the $V^{++}$ ions while charging, and the $V^{++}$ ions are oxidized back to the $V^{+++}$ ions while discharging; b) $Cr^{+++}/Cr^{++}$, wherein the $Cr^{+++}$ ions are reduced to the $Cr^{++}$ ions while charging, and the $Cr^{++}$ ions are oxidized back to the $Cr^{+++}$ ions while discharging; c) $NbO^{++}/NbO^+$, wherein the $NbO^{++}$ ions are reduced to the $NbO^+$ ions while charging, and the $NbO^+$ ions are oxidized back to the $NbO^{++}$ ions while discharging; d) $UO_2^+/UO_2^{++}$, wherein the $UO_2^{++}$ ions are reduced to the $UO_2^+$ ions while charging, and the $UO_2^+$ ions are oxidized back to the $UO_2^{++}$ ions while discharging; and e) $Ti^{+3}/Ti^{++}$, wherein the $Ti^{+3}$ ions are reduced to the $TiO^{++}$ ions while charging, and the $TiO^{++}$ ions are oxidized back to the $Ti^{+3}$ ions while discharging.

The liquid phase of described electrode liquid can be aqueous solution, non aqueous (organic) solution, inorganic fused salt or organic fused salt.

The supercapacitor according to the present invention comprises a separator member disposed between the positive electrode member and the negative electrode member, wherein the separator member comprising an ion exchange membrane, wherein the positive electrode member and the negative electrode member are bonded to opposite interface surfaces of the separator member. The separator membrane is designed to block interpenetration of redox agents between the positive and negative electrodes while allowing the passage of ions freely. The separator membrane can be any material known in the art for use as an anion exchange membrane (homogeneous or nonhomogeneous), a cation exchange membrane (homogeneous or nonhomogeneous), or a micropore membrane. The thickness of the separator membrane is preferably from about 0.01 mm to 2.0 mm.

The supercapacitor according to the present invention accomplishes energy transformation by the electrode reaction of electrochemically active materials in the liquid phase, so it has higher energy density than existing various types of supercapacitors, and is an innovative pseudo-capacity-type supercapacitor. Because it is based upon a thin liquid layer of electrochemical active material to obtain pseudo-capacity, the supercapacitor of the present invention has a higher power density, longer cycle life, lower cost, and is safer relative to a conventional storage battery. The principle for the present invention is to take advantage of the electrochemical oxidization/reduction reaction of thin liquid layer of electrochemical active material on the electrode surface. In detail, the energy is stored in the chemicals with electrochemical activity in the thin liquid layer on electrode surface. During the charging course the electric energy is converted into chemical energy of active materials in the liquid phase. In contrast, during the discharging course the chemical energy in the aqueous phase is converted back into electric energy. The entire process does not involve solid phase reaction nor does it involve solid phase ion transport and embedment so the cycle life is long. The energy density correlates with the total amount of active materials in the liquid phase (if the concentration of active material is 2 mol/L, then the whole capacity density of supercapacitor will be up to 18 Ah/L or 15 Ah/kg). As such, the energy density does not have a direct relation to the surface area of solid electrode as in conventional prior art supercapacitors. The ion diffusion coefficient in the liquid phase is increased to more than 3 orders of magnitude than that in solid phase, therefore, the supercapacitor of the present invention has a higher power density, and the energy density is also higher than the existing supercapacitors. This allows the supercapacitors of the present invention to be suitable for use as a supplementary energy source for electrically-propelled mobiles to provide starting power and recycle braking energy. Urban mobiles (especially buses) need to start and brake during working frequently, so there will be remarkable economic effects to use the present invention.

Accordingly, the present invention provides an innovative energy storage device. Since the liquid inside the micropores of the porous electrode is non-flowing, the mass transfer mainly depends on diffusion and electromigration. The micropore size is very small and at any random point, the liquid in the micropore is very close to the porous electrode surface so the time from mass transfer to porous electrode surface is very short. When charging and discharging, the electrochemically active materials can rapidly mass transfer to the electrode surface to conduct the electrochemical reaction. Accordingly, they can be fully utilized to generate pseudo-capacity on a seconds time level with very high power output capability and furthermore no chemical and physical changes occur on the electrode solid phase before or after charging and discharging. In sum, the present invention has the following outstanding advantages (see Table 1).

1. The power density is very high (charge and discharge within 10 seconds or at a higher rate).

2. The electrochemical pseudo-capacity depends on the electrochemical active material content in thin liquid layer, and is much higher than that of electrochemical electric double layer supercapacitor, and also is higher than supercapacitor with solid phase process pseudo-capacity, and has higher single charging and discharging energy density.

3. Since no solid phase change occurs while charging and discharging, the cycle performance is excellent, and the life time is longer, the cycle life is two orders of magnitude higher than that of storage battery, therefore the charging and discharging "life-span energy density" (cycle number multiple single charging and discharging energy density) is higher than existing storage batteries and supercapacitors.

4. The electrochemical active materials can be selected broadly, and can use resource rich and environment friendly electrochemical active materials (for example vanadium, ferric, etc.).

5. The structure of battery is simple, the manufacturing cost is cheaper, and the materials can be early recycled.

Based on the above described advantages, the present invention can be used not only as ideal complementary power source for hybrid electric vehicle to recycle arresting energy and provide accelerating energy for startup, but also as the main energy source for pure electric vehicles need to be charged quickly at express public transit stations (loading and unloading time), furthermore, it can be used as high power source for military or civil uses.

TABLE 1

Comparison of power sources of vehicles (pure electric and hybrid electric)

| No. | Parameter | Storage battery | Existing supercapacitor | Present invention |
|---|---|---|---|---|
| A | Specific power | * | *** | *** |
| B | Specific energy | *** | * | ** |
| C | Normal rapid charging and discharging | Hourly | Extremely short | Typical 10 s |
| D | Cycling life | * | *** | *** |
| E | Life - span specific energy[1] | ** | ** | *** |
| F | Simplicity for manufacture | * | ** | *** |
| G | Low cost | * | **, *** | *** |
| H | Cost performance | ** | ** | *** |
| J | Resource feasibility | *** | *, *** | *** |
| K | Environmental protection | **, *** | *** | *** |
| L | Maintenance - free | **, *** | *** | *** |

[1] = The total specific energy representatives the total kilometer number for power source.

EXAMPLES

The following embodiments in combination with the figures are used to further illustrate the present invention.

Example 1

As shown in FIG. 1, the an embodiment of a supercapacitor according to the present invention comprises positive electrode collector 11, positive electrode chamber 12, separator membrane 13, negative electrode chamber 14, and negative electrode collector 15.

Figure 3:
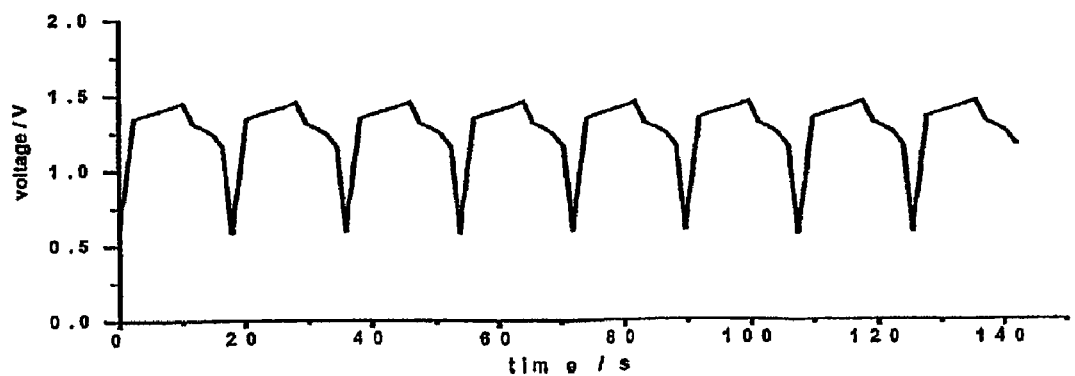
FIG. 3 is a charging and discharging curve of embodiments of the present invention.
Figure 4:
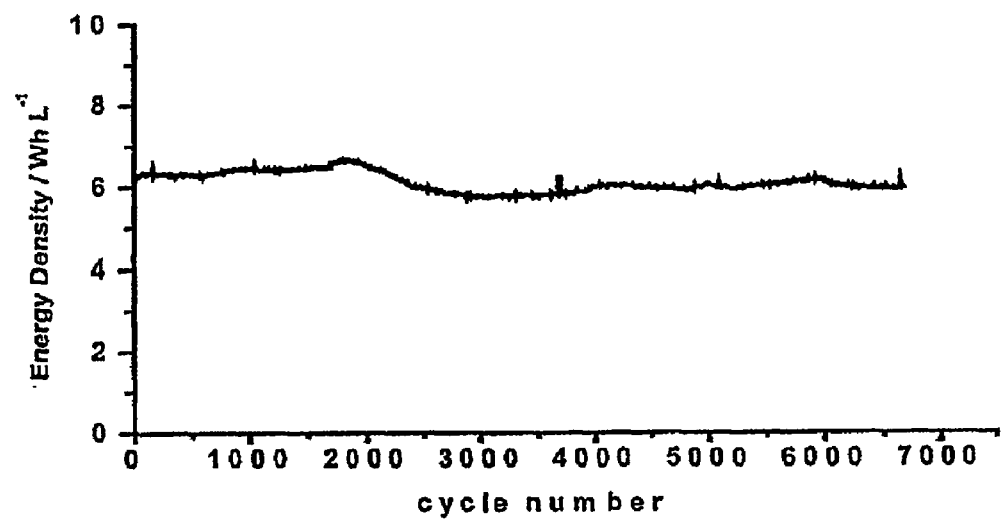
FIG. 4 shows a cycling performance curve of embodiments of the present invention.

Graphite felt fabric was employed as both positive and negative chamber 12 and 14 of the supercapacitor. Positive and negative electrode chamber 12 and 14 also act as positive and negative electrodes, respectively. The thickness of the graphite felt fabric was 200 μm, the voidage was 90%. The thickness of positive electrode chamber and negative electrode chamber was from about 0.01 mm to 5.0 mm. 2M $VOSO_4/(VO_2)_2SO_4+1M\ H_2SO_4$ was employed as the positive electrode electrolyte, and 2M $VOSO_4N_2\ (SO_4)_3+1M\ H_2SO_4$ was employed as the negative electrode electrolyte. A cation exchange membrane was employed as separator membrane 13, and graphite was employed as positive and negative electrode collector 11 and 15. FIG. 3 shows the charging-discharging working curve of this supercapacitor. FIG. 4 shows the cycling curve of 7000 times for this supercapacitor. It can be seen that this supercapacitor possesses higher capacity and excellent cycle performance.

Since both positive and negative electrode chambers are solid porous electrodes, the micropores inside porous electrode are full of non-flowing positive and negative electrode liquid. Because the positive and negative electrode liquid respectively contains at least one positive and negative electrode electrochemical active material, the electrochemical oxidation-reduction reactions are conducted primarily on the inner surface of the positive and negative electrode chambers.

Example 2

Figure 2:
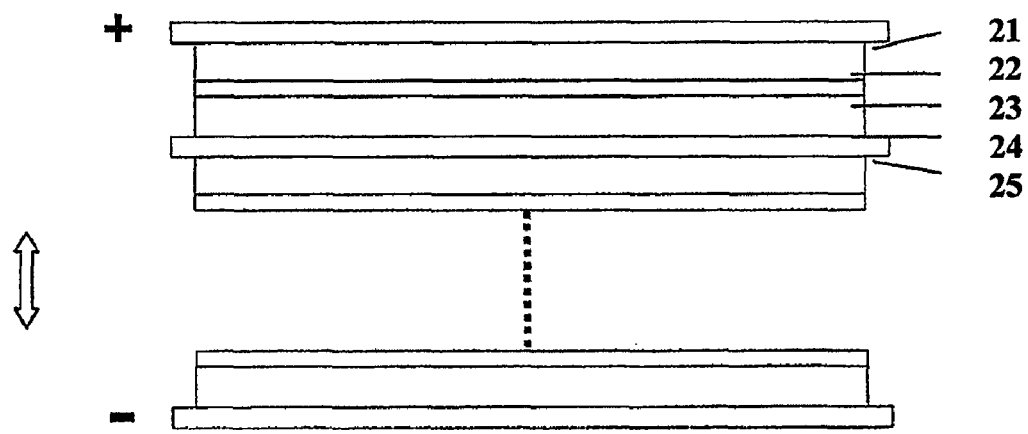
FIG. 2 shows structural representation of Example 2 of the present invention.

As shown in FIG. 2, another embodiment of a supercapacitor according to the present invention comprises multiple capacitors in series. In this embodiment, a foam nickel plate was adopted as positive electrode chamber 22 of the supercapacitor, and the activated carbon was employed as negative electrode chamber 24. The thickness of the foam nickel was 2 mm, and the voidage was 90%. The thickness of the activated carbon was 5 mm, and the voidage is 50%. 2M $FeSO_4/Fe_2(SO_4)_3+1M\ H_2SO_4$ was employed as the positive electrode electrolyte, while 2M $Ti_2(SO_4)_3/TiOSO_4+1M\ H_2SO_4$ was employed as the negative electrode electrolyte. An anion exchange membrane was employed as separator membrane 23, and a nickel sheet was used as collector 21 and 25 of positive and negative electrodes, wherein negative electrode collector 25 was a positive and negative dipolar type collector.

Example 3

In this example, the supercapacitor shown in FIG. 1 was employed.

Carbon fabric was employed as positive and negative electrode chamber 12 and 14 of the supercapacitor. Positive and negative electrode chamber 12 and 14 also act as the positive and negative electrodes. The thickness of the carbon cloth was 1 mm and the voidage was 60%. 2M $VOSO_4/(VO_2)_2SO_4+1M\ Ce(SO_4)_2/Ce_2(SO_4)_3+1M\ H_2SO_4$ was employed as the positive electrode electrolyte and 2M $(UO_2)_2SO_4/UO_2SO_4+1M\ H_2SO_4$ was employed as the negative electrode electrolyte. An anion exchange membrane was employed as separator membrane 13, and a stainless steel sheet was employed as collector 11 and 15 of the positive and negative electrodes.

Example 4

In this example, the supercapacitor shown in FIG. 1 was employed.

In this example, a polyaniline film was employed as positive and negative electrode chamber 12 and 14 of the supercapacitor. Positive and negative electrode chamber 12 and 14 also act as positive and negative electrodes. The thickness of the polyaniline film was 0.1 mm and the voidage was 50%. 1M $Br_2+2M\ NaBr$ was employed as positive electrode electrolyte and 2M $Na_2S_x+1M\ NaOH$ was employed as the negative electrode electrolyte. A cation exchange membrane was used as separator membrane 13 and a nickel screen was employed as the positive and negative electrode collectors 11 and 15.

Example 5

In this example, the supercapacitor shown in FIG. 2 was employed.

Electrically conductive plastic was employed as a double electrode plate and collector 25. Positive and negative electrode chambers 22 and 24 were made of a carbon nano-tube composite material. Separator membrane 23 was made of a polypropylene membrane coated with a layer of Nafion™, the thickness of which is 0.05 mm. 2M $NbO(NO_3)_4/(NbO_2)NO_3+1M\ HNO_3$ was employed as the positive electrode electrolyte and 2M $(NbO)(NO_3)_2/(NbO)NO_3+1M\ HNO_3$ was employed as the negative electrode electrolyte.

What is claimed is:

1. A supercapacitor comprising:
   a) a positive electrode member comprising a solid material comprising pores and an electrically conductive current collector element wherein the pores comprise a non-flowing liquid comprising a redox agent;
   b) a negative electrode member comprising a solid material comprising pores and an electrically conductive current collector element wherein the pores comprise a non-flowing liquid comprising a redox agent; and
   c) a separator member disposed between the positive electrode member and the negative electrode member, wherein the separator member is an ion exchange membrane.

2. The supercapacitor of claim 1 wherein the solid material comprising pores in each of the positive electrode member and the negative electrode member is selected from the group consisting of: a carbon material, an inert or passivated metal, a metal alloy material, and a conductive polymer.

3. The supercapacitor of claim 2 wherein the carbon material is selected from the group consisting of: graphite, carbon black, carbon nanometer tubes, activated carbon, amorphous carbon, and graphite felt fabric.

4. The supercapacitor of claim 3 wherein the carbon material is graphite felt fabric.

5. The supercapacitor of claim 2 wherein the inert or passivated metal is selected from the group consisting of: nickel and a noble metal.

6. The supercapacitor of claim 1 wherein the pores in the solid material in each of the positive electrode member and the negative electrode member are from 0.1 to 100 μm in size.

7. The supercapacitor of claim 1 wherein the redox agent in the positive electrode liquid is selected from the group consisting of:
   a) $VO^{++}/VO_2^+$, wherein the $VO^{++}$ ions are oxidized to the $VO_2^+$ on while charging, and the $VO_2^+$ ions are reduced to the $VO^{++}$ ions while discharging;
   b) $Br^-/Br_2$, wherein $Br^-$ ions are oxidized to the $Br_2$ molecule while charging, and the $Br_2$ molecule is reduced to the $Br^-$ ion while discharging;
   c) $NbO^{++++}/NbO_2^+$, wherein the $NbO^{++++}$ ions are oxidized to the $NbO_2^+$ on while charging, and the $NbO_2^+$ ions are reduced to the $NbO^{++++}$ ions while discharging;
   d) $Fe^{++}/Fe^{+++}$ wherein the $Fe^{++}$ ions are oxidized to the $Fe^{+++}$ ions while charging, and the $Fe^{+++}$ ions are reduced to the $Fe^{++}$ ions while discharging; and
   e) $Ce^{+3}/Ce^{+4}$, wherein the $Ce^{+3}$ ions are oxidized to the $Ce^{+4}$ ions while charging, and the $Ce^{+4}$ ions are reduced to the $Ce^{+3}$ ions while discharging.

8. The supercapacitor of claim 1 wherein the redox agent in the negative electrode liquid is selected from the group consisting of:
   a) $V^{+++}/V^{++}$ wherein the $V^{+++}$ ions are reduced to the $V^{++}$ ions while charging, and the $V^{++}$ ions are oxidized back to the $V^{+++}$ ions while discharging;
   b) $Cr^{+++}/Cr^{++}$, wherein the $Cr^{+++}$ ions are reduced to the $Cr^{++}$ ions while charging, and the $Cr^{++}$ ions are oxidized back to the $Cr^{+++}$ ions while discharging;
   c) $NbO^{++}/NbO^{+}$, wherein the $NbO^{++}$ ions are reduced to the $NbO^{+}$ ions while charging, and the $NbO^{+}$ ions are oxidized back to the $NbO^{++}$ ions while discharging;
   d) $UO_2^{+}/UO_2^{++}$, wherein the $UO_2^{++}$ ions are reduced to the $UO_2^{+}$ ions while charging, and the $UO_2^{+}$ ions are oxidized back to the $UO_2^{++}$ ions while discharging; and
   e) $Ti^{+3}/TiO^{++}$, wherein the $Ti^{+3}$ ions are reduced to the $TiO^{++}$ ions while charging, and the $TiO^{++}$ ions are oxidized back to the $Ti^{+3}$ ions while discharging.

9. The supercapacitor of claim 1 wherein the ion exchange membrane is selected from the group consisting of: a homogeneous anion exchange membrane, a non-homogeneous anion exchange membrane, a homogeneous cation exchange membrane, and a non-homogeneous cation exchange membrane.

10. The supercapacitor of claim 9 wherein the separator membrane has a thickness of 0.01 mm to about 2.0 mm.

11. A supercapacitor comprising:
   a) a positive electrode member comprising a solid material comprising pores and an electrically conductive current collector element wherein the pores comprise a non-flowing liquid comprising a redox agent;
   b) a negative electrode member comprising a solid material comprising pores and an electrically conductive current collector element wherein the pores comprise a non-flowing liquid comprising a redox agent; and
   c) a separator member disposed between the positive electrode member and the negative electrode member, wherein the separator member comprises a microporous membrane.

12. The supercapacitor of claim 11 wherein the solid material comprising pores in each of the positive electrode member and the negative electrode member is selected from the group consisting of: a carbon material, an inert or passivated metal, a metal alloy material, and a conductive polymer.

13. The supercapacitor of claim 12 wherein the carbon material is selected from the group consisting of: graphite, carbon black, carbon nanometer tubes, activated carbon, amorphous carbon, and graphite felt fabric.

14. The supercapacitor of claim 12 wherein the inert or passivated metal is selected from the group consisting of: nickel and a noble metal.

15. The supercapacitor of claim 11 wherein the pores in the solid material in each of the positive electrode member and the negative electrode member are from 0.1 to 100 µm in size.

16. The supercapacitor of claim 11 wherein the first redox reagent is selected from the group consisting of:
   a) $VO^{++}/VO_2^{+}$, wherein the $VO^{++}$ ions are oxidized to the $VO_2^{+}$ ion while charging, and the $VO_2^{+}$ ions are reduced to the $VO^{++}$ ions while discharging;
   b) $Br^{-}/Br_2$, wherein $Br^{—}$ ions are oxidized to the $Br_2$ molecule while charging, and the $Br_2$ molecule is reduced to the $Br^{-}$ ion while discharging;
   c) $NbO^{++++}/NbO_2^{+}$, wherein the $NbO^{++++}$ ions are oxidized to the $NbO_2^{+}$ on while charging, and the $NbO_2^{+}$ ions are reduced to the $NbO^{++++}$ ions while discharging;
   d) $Fe^{++}/Fe^{+++}$, wherein the $Fe^{++}$ ions are oxidized to the $Fe^{+++}$ ions while charging, and the $Fe^{+++}$ ions are reduced to the $Fe^{++}$ ions while discharging; and
   e) $Ce^{+3}/Ce^{+4}$, wherein the $Ce^{+3}$ ions are oxidized to the $Ce^{+4}$ ions while charging, and the $Ce^{+4}$ ions are reduced to the $Ce^{+3}$ ions while discharging.

17. The supercapacitor of claim 11 wherein the second redox reagent is selected from the group consisting of:
   a) $V^{+++}/V^{++}$, wherein the $V^{+++}$ ions are reduced to the $V^{++}$ ions while charging, and the $V^{++}$ ions are oxidized back to the $V^{+++}$ ions while discharging;
   b) $Cr^{+++}/Cr^{++}$, wherein the $Cr^{+++}$ ions are reduced to the $Cr^{++}$ ions while charging, and the $Cr^{++}$ ions are oxidized back to the $Cr^{+++}$ ions while discharging;
   c) $NbO^{++}/NbO^{+}$, wherein the $NbO^{++}$ ions are reduced to the $NbO^{+}$ ions while charging, and the $NbO^{+}$ ions are oxidized back to the $NbO^{++}$ ions while discharging;
   d) $UO_2^{+}/UO_2^{++}$, wherein the $UO_2^{++}$ ions are reduced to the $UO_2^{+}$ ions while charging, and the $UO_2^{+}$ ions are oxidized back to the $UO_2^{++}$ ions while discharging; and
   e) $Ti^{+3}/TiO^{++}$, wherein the $Ti^{+3}$ ions are reduced to the $TiO^{++}$ ions while charging, and the $TiO^{++}$ ions are oxidized back to the $Ti^{+3}$ ions while discharging.

* * * * *